(12) United States Patent
Song et al.

(10) Patent No.: US 11,463,905 B2
(45) Date of Patent: Oct. 4, 2022

(54) ADAPTIVE IN-BAND NETWORK TELEMETRY FOR FULL NETWORK COVERAGE

(71) Applicant: HUAWEI TECHNOLOGIES CO., LTD., Shenzhen (CN)

(72) Inventors: Haoyu Song, San Jose, CA (US); Tianran Zhou, Shenzhen (CN); Min Liu, Shenzhen (CN); Zhenbin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/100,656

(22) Filed: Nov. 20, 2020

(65) Prior Publication Data
US 2021/0084530 A1    Mar. 18, 2021

Related U.S. Application Data

(63) Continuation of application No. PCT/US2019/051075, filed on Sep. 13, 2019.

(51) Int. Cl.
*H04L 29/06* (2006.01)
*H04W 28/02* (2009.01)
*H04L 69/22* (2022.01)

(52) U.S. Cl.
CPC ......... *H04W 28/0289* (2013.01); *H04L 69/22* (2013.01); *H04W 28/0231* (2013.01)

(58) Field of Classification Search
CPC ....... H04L 43/024; H04L 43/04; H04L 69/22; H04W 28/0231; H04W 28/0289
See application file for complete search history.

(56) References Cited

U.S. PATENT DOCUMENTS

| | | | |
|---|---|---|---|
| 6,681,249 B2* | 1/2004 | Christensen | H04L 43/103 709/227 |
| 9,106,546 B1* | 8/2015 | Naik | H04L 47/10 |
| 9,270,489 B1* | 2/2016 | Wells | H04L 12/56 |
| 9,749,718 B1* | 8/2017 | Friel | H04Q 9/00 |
| 9,998,979 B2* | 6/2018 | Cui | H04W 24/10 |
| 2018/0027309 A1* | 1/2018 | Friel | H04Q 9/00 340/870.01 |
| 2018/0159770 A1* | 6/2018 | Nakagawa | H04L 45/26 |
| 2020/0186465 A1* | 6/2020 | Dontula Venkata | H04L 69/22 |
| 2020/0322353 A1* | 10/2020 | Bhandari | H04L 63/1425 |
| 2020/0389409 A1* | 12/2020 | Karuppiah | H04L 47/365 |

FOREIGN PATENT DOCUMENTS

CN    109672591 A    4/2019

OTHER PUBLICATIONS

Lu, B., et al., "iFIT: Intelligent Flow Information Telemetry," Association for Computer Machinery, 2019, 3 pages.

* cited by examiner

*Primary Examiner* — Alpus Hsu
(74) *Attorney, Agent, or Firm* — Conley Rose, P.C.

(57) ABSTRACT

A mechanism for adaptively performing in-band network telemetry (INT) by a network controller is disclosed. The mechanism includes receiving one or more congestion indicators from a collector. An adjusted sampling rate is generated. The adjusted sampling rate is a specified rate of insertion of instruction headers for INT and is generated based on the congestion indicators. The adjusted sampling rate is transmitted to a head node, which is configured to perform INT via instruction header insertion into user packets.

20 Claims, 4 Drawing Sheets

FIG. 4

ADAPTIVE IN-BAND NETWORK TELEMETRY FOR FULL NETWORK COVERAGE

CROSS-REFERENCE TO RELATED APPLICATIONS

This patent application is a continuation of International Application No. PCT/US2019/051075, filed Sep. 13, 2019, by Haoyu Song, et al., and titled "Adaptive In-band Network Telemetry For Full Network Coverage," the teachings and disclosure of which are hereby incorporated in their entirety by reference thereto.

TECHNICAL FIELD

The present disclosure is generally related to network telemetry, and is specifically related to adaptive management of an In-band Network Telemetry (INT) system in a communication network.

BACKGROUND

Operations, administration, and management (OAM) includes the processes, activities, tools, and standards used to operate, administer, manage, and maintain a system, such as a telecommunications network. In order to perform OAM, a system should have access to the accurate real-time data regarding the status of the network as a whole as well as the status of the component portions of the network. Such information can be used to support communication monitoring, network routing, error diagnosis, failover management, etc. Accordingly, the effectiveness of OAM in a telecommunications network can be increased by increasing the accuracy, timeliness, and granularity of the network status data.

SUMMARY

In an embodiment, the disclosure includes a method comprising receiving, by a receiver of a controller, one or more congestion indicators from a collector. The method further comprises generating, by a processor of the controller, an adjusted sampling rate of instruction header insertion for in-band network telemetry (INT) based on the congestion indicators. The method further comprises transmitting, by a transmitter of the controller, the adjusted sampling rate to a head node configured to perform INT via instruction header insertion into user packets. For example, in some systems INT is performed at a head end node by inserting instruction headers into user packets. The instruction header directs each node in a path to collect indicated telemetry data and report such telemetry back to a collector. Such systems may employ a preconfigured sampling rate. This may result in dropped packets if the sampling rate is set too high or reduced telemetry data granularity if the sampling rate is set too low. In such systems, the head end node may not have access to data that would allow the head end node to determination or even a suggestion as to an appropriate sampling rate. The present embodiment includes a mechanism for dynamically adjusting the INT sampling rate according to current network conditions by using congestion indicators.

Optionally, in any of the preceding aspects, another implementation of the aspect provides, wherein the congestion indicators include latency, packet loss, buffer size, explicit congestion notification, or combinations thereof.

Optionally, in any of the preceding aspects, another implementation of the aspect provides, wherein the adjusted sampling rate indicates a probability of instruction header insertion for each user packet. In this embodiment, the sampling rate is implemented as a probability. The head end node may employ pseudorandom number generation to determine, for each user packet in a flow, whether an instruction header should be added. This results in a percentage of user packets receiving instruction headers without strict correlations between sampling rate and packet order.

Optionally, in any of the preceding aspects, another implementation of the aspect provides, wherein the adjusted sampling rate indicates a frequency of instruction header insertion per group of user packets. In this embodiment, the sampling rate is implemented as a frequency. This results in a set of user packets in receiving instruction headers in a consistent order based on the percentage (e.g., twenty five percent is every fourth packet, fifty percent is every other packet, seventy five percent is three packets out of four, etc.)

Optionally, in any of the preceding aspects, another implementation of the aspect provides, wherein the adjusted sampling rate is generated and transmitted periodically. In this embodiment, the sampling rate is increased or decreased based on the absence or presence, respectively, of congestion indicators over a predefined period.

Optionally, in any of the preceding aspects, another implementation of the aspect provides, wherein a period for generating and transmitting the adjusted sampling rate is set as a round trip time of a user packet between the head node and an end node.

Optionally, in any of the preceding aspects, another implementation of the aspect provides, wherein the adjusted sampling rate is generated based on a previous sampling rate and the congestion indicators according to additive increase and multiplicative decrease.

Optionally, in any of the preceding aspects, another implementation of the aspect provides, further comprising transmitting, by the transmitter, an instruction to the head node to perform postcard based INT.

Optionally, in any of the preceding aspects, another implementation of the aspect provides, further comprising transmitting, by the transmitter, an instruction to the head node to perform passport based INT.

In an embodiment, the disclosure includes a controller comprising a receiver configured to receive one or more congestion indicators from a collector. The controller further comprises a processor configured to receive the congestion indicators from the receiver and to receive computer instructions which, when executed, prompt the controller to generate an adjusted sampling rate of instruction header insertion for INT based on the congestion indicators. The controller further comprises a transmitter configured to receive the adjusted sampling rate from the processor and to transmit the adjusted sampling rate to a head node configured to perform INT via instruction header insertion into user packets. For example, in some systems INT is performed at a head end node by inserting instruction headers into user packets. The instruction header directs each node in a path to collect indicated telemetry data and report such telemetry back to a collector. Such systems may employ a preconfigured sampling rate. This may result in dropped packets if the sampling rate is set too high or reduced telemetry data granularity if the sampling rate is set too low. In such systems, the head end node may not have access to data that would allow the head end node to determination or even a suggestion as to an appropriate sampling rate. The present embodiment includes a mechanism for dynamically adjusting the INT sampling rate according to current network conditions by using congestion indicators.

Optionally, in any of the preceding aspects, another implementation of the aspect provides, wherein the congestion indicators include latency, packet loss, buffer size, explicit congestion notification, or combinations thereof.

Optionally, in any of the preceding aspects, another implementation of the aspect provides, wherein the adjusted sampling rate indicates a probability of instruction header insertion for each user packet. In this embodiment, the sampling rate is implemented as a probability. The head end node may employ pseudorandom number generation to determine, for each user packet in a flow, whether an instruction header should be added. This results in a percentage of user packets receiving instruction headers without strict correlations between sampling rate and packet order.

Optionally, in any of the preceding aspects, another implementation of the aspect provides, wherein the adjusted sampling rate indicates a frequency of instruction header insertion per group of user packets. In this embodiment, the sampling rate is implemented as a frequency. This results in a set of user packets in receiving instruction headers in a consistent order based on the percentage (e.g., twenty five percent is every fourth packet, fifty percent is every other packet, seventy five percent is three packets out of four, etc.)

Optionally, in any of the preceding aspects, another implementation of the aspect provides, wherein the adjusted sampling rate is generated and transmitted periodically. In this embodiment, the sampling rate is increased or decreased based on the absence or presence, respectively, of congestion indicators over a predefined period.

Optionally, in any of the preceding aspects, another implementation of the aspect provides, wherein a period for generating and transmitting the adjusted sampling rate is set as a round trip time of a user packet between the head node and an end node.

Optionally, in any of the preceding aspects, another implementation of the aspect provides, wherein the adjusted sampling rate is generated based on a previous sampling rate and the congestion indicators according to additive increase and multiplicative decrease.

Optionally, in any of the preceding aspects, another implementation of the aspect provides, wherein the transmitter is further configured to transmit an instruction to the head node to perform postcard based INT.

Optionally, in any of the preceding aspects, another implementation of the aspect provides, wherein the transmitter is further configured to transmit an instruction to the head node to perform passport based INT.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a controller comprising receiving means for receiving one or more congestion indicators from a collector. The controller further comprises a sampling adjustment means for generating an adjusted sampling rate of instruction header insertion for INT based on the congestion indicators. The controller further comprises a transmitting means for transmitting the adjusted sampling rate to a head node configured to perform INT via instruction header insertion into user packets.

Optionally, in any of the preceding aspects, another implementation of the aspect provides, wherein the controller is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

User packets traverse a communications network in flows. Examining a packet trace for a flow along a forwarding path is an example mechanism that provides detailed packet and flow visibility, and hence supports effective network OAM. Such path associated data may reflect the state and status of each flow packet's real-time experience. Such data may also provide valuable information for network monitoring, measurement, and diagnosis. The path associated data may include, for example, a detailed forwarding path for the flow, a timestamp and/or latency for the flow at each network node, etc. Programmable data plane devices may allow even more sophisticated data to be retrieved. All such data can be considered path associated flow data, which can only be derived by measuring live user packets. Such data may complement with the other data acquired through indirect passive and active collecting and measurements such as network flow (NETFLOW) and Internet Control Message Protocol (ICMP).

INT is an example mechanism/system that supports gathering telemetry from live user packets. In-situ OAM (iOAM) and postcard based telemetry (PBT) are example implementations of INT as described by the internet engineering task force (IETF). INT operates by augmenting packet headers used by line user packets. Specifically, a head node augments the user packet headers with instructions that indicate which telemetry measurements should be made by each network node along a flow path. The resulting measurement data can be inserted into and travel along with the user packet. The end node of the flow path can then strip off the data trace and corresponding measurement data and exports the measurement data to a collector for an OAM system for analysis. This approach can also be referred to as passport based INT. PBT is a variation of INT. In PBT, the measurement data is not inserted into the corresponding user packet. Instead, the measurement data is sent directly to the collector through a dedicated export packet called a postcard.

One downside to INT is that INT adds extra packet processing, data collection, and exporting demands onto the network nodes. The additional workload associated with INT may have a negative impact on the performance of the network data plane, which can result in network congestion, packet loss, and/or inaccurate measurement data. One reason for this issue is that the head node can elect whether to add an INT header to a specific packet/flow, but the head node may have no understanding of when and/or how often the INT header should be added. For example, adding the INT header to too many packets may exhaust network resources to the point of causing user traffic delays and/or dropped user packets. As another example, adding the INT header to too few packets may result in reductions in the accuracy, timeliness, and granularity of the network measurements, and hence frustrate the purpose of the INT system.

Disclosed herein are mechanisms to dynamically adjust a sampling rate of INT in order to adapt to network conditions. This in turn allows for maximizing INT coverage over a network without negatively impacting user traffic forwarding. A network can implement INT by employing a controller and a collector in communication with network nodes. The controller can direct a head node for a flow to begin including INT instruction headers into user packets at a sampling rate. The sampling rate expresses a number of user packets that receive an INT instruction header per predefined group of user packets. The sampling rate can be expressed as a probability and/or as a frequency, depending on the example. The sampling rate may be set at a value from zero percent to one hundred percent, inclusive. The nodes along the flow path then execute the INT instruction headers and take telemetry measurements. The telemetry measurements are forwarded to a collector, for example as postcards from the path nodes or as a passport from an end node along the path of the flow. The collector can then analyze the postcards/passports for congestion indicators. Such congestion indicators may include latency, packet loss, buffer size, explicit congestion notification, or combinations thereof. The collector can then forward the congestion indicators to the controller. The controller can then adjust the sampling rate based on the congestion indicators and forward the adjusted sampling rate to the head node to alter the rate of INT instruction header insertion. For example, the sampling rate can be initialized at one hundred percent. The sampling rate can be adjusted down when congestion indicators are received and adjusted back up when no congestion indicators are received over a predefined period, such as a round trip time (RTT) associated with user packets in a flow. As a specific example, the controller can employ an additive increase and multiplicative decrease (AIMD) mechanism. In AIMD the sampling rate is increased over each period by a predefined delta value and decreased by a multiplier value, such as one quarter, one half, etc. This approach slowly raises the sampling rate when no congestion is present and quickly lowers the sampling rate when congestion is detected in order to minimize the instances when INT has a measureable impact on the forwarding plane of the communication network. However, AIMD is a single example and many other rate sampling adjustment mechanisms can be employed within the scope of the present disclosure.

Figure 1:
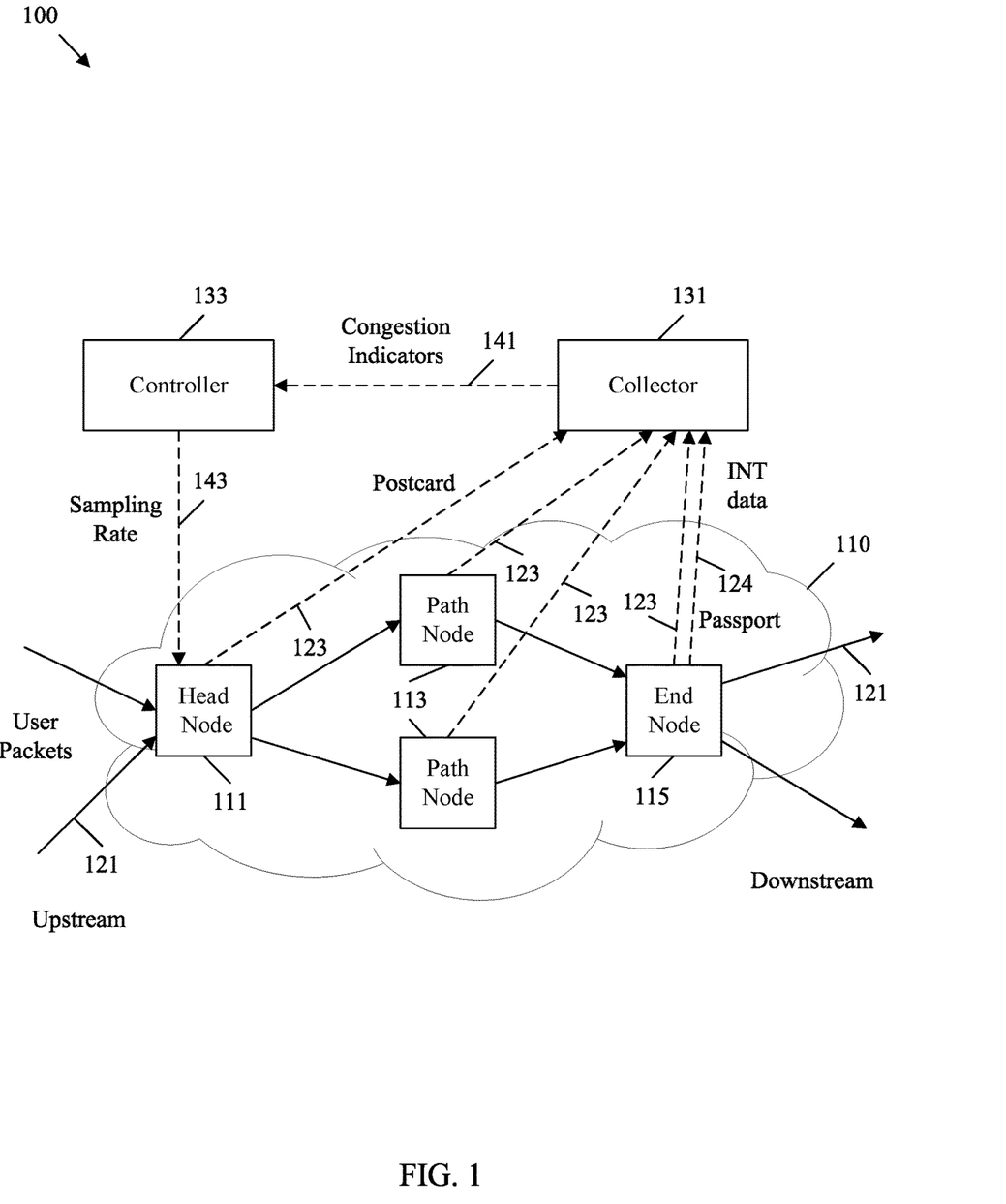
FIG. 1 is a schematic diagram of an example INT system operating in a communications network.

FIG. 1 is a schematic diagram of an example INT system 100 operating in a communications network 110. A communications network 110 is a group of network nodes connected via links capable of supporting communications between entry points and exit points at the edges of the network. A communications network 110 may support many simultaneous communications, some of which are bidirectional. As such, a node may act as an entry point, an exit point, or both, for different communications. Nodes that can act as an entry point or exit point into the communications network 110 may be referred to as edge nodes. A node in a communications network 110 is a connection point that can receive, create, store, and/or send data along a path. A node may refer to a hardware component with processors, transceivers, memory, etc. and/or to an abstracted logical connection point operating on such hardware. For example, a node may include a router, switch, bridge, software defined node, etc. Nodes are connected by links, which is a physical and/or logical network component capable of interconnecting nodes and/or hosts for the purpose of supporting transmissions between the nodes. For example, a link may include optical links, electrical links, and/or wireless links.

Communications may traverse the communications network 110 in a data plane and may be controlled by a management plane. As shown in FIG. 1, exemplary data plane communications are depicted with solid arrows and exemplary management plane communications are depicted with dashed arrows. In an example, the communications network 110 may be configured as a transport network which forwards user communications between network edges. Such user communications include streams of user packets 121 organized into flows. A flow is a stream of user packets 121 between a common source and a common destination. An edge node that receives a flow into a network from a source host may be referred to as a head node 111. An edge node that forwards the flow out network toward a destination host may be referred to as an end node 115. A flow traverses the communications network 110 from the head node 111 to the end node 115 via a path that traverses various path nodes 113, which may be any combination of internal and/or external nodes. Paths may be predetermined by a controller 133 and setup before a flow begins traversing the communications network 110 as a function of the management plane. FIG. 1 depicts a unidirectional flow proceeding from an upstream direction toward a downstream direction for simplicity of discussion. However, flows may be bidirectional, and hence the end node 115 may act as a head node 111 for a related portion of the flow proceeding in the opposite direction.

INT is a mechanism for gathering telemetry data related to the operation of the communications network 110. Telemetry is the process of gathering measurements and/or data from a remote point. Telemetry may also refer to any measurements results and/or data gathered by such measurements. As noted above, telemetry data may be used to support OAM. For example, the management plane may employ telemetry data to route and/or reroute flow, to report equipment failures to support repairs, to correct misconfiguration, to support communication scheduling, etc. Such telemetry can be reported to a collector 131 and acted upon by a controller 133.

A collector 131 is a node in the management plane that receives, interprets, and/or reports telemetry data from the nodes in the data plane of the communications network 110. A controller 133 is a node in the management plane that controls the operation of the communications network 110, sub-domains of the communications network 110, and/or components thereof. The collector 131 and the controller 133 may be implemented as hardware components with processors, transceivers, and memory. The collector 131 and the controller 133 may also be implemented as abstracted groups of related functionality that are distributed (e.g., dynamically) across multiple machines that contain such hardware. The collector 131 and the controller 133 may have many functions in practical applications, some of which are beyond the scope of this disclosure. In an embodiment, the collector 131 and the controller 133 operate together to manage INT in the communications network 110.

When performing INT, the head node 111 receives the user packets 121 entering the communications network 110 and forwards the user packets 121 along the relevant flow path toward the end node 115. While performing such forwarding, the head node 111 also inserts an INT instruction header into a sub-set of the user packets 121. The INT instructions contained in the INT instruction header are directed to one or more of the nodes along the flow path. As the user packets 121 are received, handled, and/or forwarded by the head node 111, path nodes 113, and/or end node 115, such nodes execute the INT instructions. The INT instructions direct the nodes to gather and export telemetry. The INT instructions can be directed to particular nodes and can be directed to particular telemetry measurements. For example, the INT instructions can direct all nodes in the path to perform one or more specified telemetry measurements. As another example, the INT instructions can direct specified nodes to perform the specified telemetry measurements, in which case nodes that are not specified forward the user packets 121 without taking such measurements. In yet another example, different nodes can be directed to take different telemetry measurements. As such, INT is highly configurable into a broad range of potential telemetry gathering permutations. The selection of telemetry measurements is also highly configurable, but may include, for example, flow based measurements, user packet 121 based measurements, and/or node hardware based measurements. As a non-limiting example, such telemetry measurements may include jitter, packet drops, latency, buffer occupancy, response time, throughput, resource availability, inter-packet delay, bandwidth data, out-of-order delivery, and/or other status and/or error indicators associated with a node, flow, and/or user packet 121. The specified nodes take the telemetry measurements as directed by the INT instructions, export the resulting telemetry data, and forward the user packets 121 along the path. The end node 115 removes the inserted INT instructions prior to forwarding the user packets 121 out of the communications network 110. As such, INT may be performed in a manner that is transparent from the perspective of the user packets 121.

As mentioned above, nodes that take telemetry should export the collected telemetry data. The mechanism for export may be preconfigured and/or defined in the INT instructions. The INT can be configured to employ a passport mechanism and/or a postcard mechanism when exporting. The following description of passport and postcard INT presumes that all nodes take telemetry data for simplicity of discussion. In passport based INT, head node 111, path nodes 113, and end node 115 measure telemetry as instructed by the INT instruction header of the user packet 121, attach resulting telemetry data to the user packet 121, and forward the user packet 121 (e.g., downstream) along the flow path. Accordingly, the end node 115 receives user packets 121 containing a list of telemetry for each node along the corresponding flow path. The end node 115 removes the list of telemetry data and the INT instruction header prior to forwarding the corresponding user packet 121. The end node 115 then includes the list of telemetry data for the nodes in the path (e.g., head node 111, a path node 113, and end node 115) in a management plane communication (e.g., a packet) called a passport 124. The end node 115 sends the passport 124 to the collector 131. As such, the passport 124 is a communication between end node 115 and the collector 131 that contains a complete set of telemetry data corresponding to the nodes along a flow path that receive and/or transmit the user packets 121.

Postcard based INT is similar to passport based INT, but employs a different export mechanism. In postcard based INT, nodes do not include telemetry data in the user packets 121. Instead, the nodes each transmit postcards 123 to the collector 131 containing the telemetry data. For example, one postcard 123 can be sent by each node per user packet 121 with an INT instruction header. As such, a postcard 123 is a communication between a specified node (e.g., head node 111, path node 113, or end node 115) and the collector 131 that contains a set of telemetry data measured by the specified node upon forwarding the user packet 121 and/or the flow.

The various INT mechanisms are highly configurable and can forward a substantial amount of telemetry data to the collector 131. This may be beneficial for OAM, but may also place stress on the data plane. Specifically, managing INT instruction headers, taking measurements, and sending passports 124 and/or postcards 123 uses resources at the head node 111, path nodes 113, and end node 115 that could otherwise be employed for forwarding more user packets 121. As such, applying INT instruction headers to all user packets 121 may result in increased congestion, latency, and even dropped user packets 121, which reduces the effectiveness of the operation of the communications network 110. Further, applying INT instruction headers to relatively few user packets 121 results in less frequent and hence lower quality telemetry, which frustrates the purpose of INT. Some INT systems are limited to setting an amount of INT usage based on user input. However, this solution does not provide guidance as to an efficient allocation of INT usage, especially since the optimal allocation of INT usage may change based on the changing demands users may place on the communications network 110 in the form of changes in the number of user packets 121 traversing the communications network 110 at different dates and times.

In order to address this issue, the collector 131 is configured to provide congestion indicators 141 to the controller 133. A congestion indicator 141 is network status data denoting evidence of a slowdown in handling of user packets 121 by a component of the communications network 110. As an example, the congestion indicators 141 can include latency, packet loss, buffer size, an explicit congestion notification, or combinations thereof. The controller 133 can use the congestion indicators 141 when setting and/or adjusting a sampling rate 143 associated with INT. For example, the controller 133 may transmit the sampling rate 143 to the head node 111 for each flow in the communications network 110 in order to control the number of user packets 121 that receive INT instruction headers. A sampling rate 143 indicates a proportion of the user packets 121 that are to receive an INT instruction header. The sampling rate 143 may be set as a value from zero percent to one hundred percent, inclusive. This allows sampling for a flow to be defined with any granularity. The largest granularity includes INT instruction headers in all the ingress user packets 121 (e.g., all the packets from head node 111 and end node 115). The value of the sampling rate 143 is determined by the current network conditions according to the congestion indicators 141.

The sampling rate 143 can be implemented using several mechanisms. For example, the sampling rate 143 can include a probability of INT instruction header insertion for each user packet 121. In such a case, the head node 111 may generate a pseudorandom value for each user packet 121, and apply the INT instruction header for user packets 121 with a pseudorandom value that is less than the sampling rate 143. In this way, a specified percentage of user packets 121 receive INT instruction headers. As another example, the sampling rate 143 can include a frequency of INT instruction header insertion per group of user packets 121. In this case, the head node 111 can apply INT instruction headers to user packets 121 at a frequency that corresponds to the requested sampling rate 143 percentage (e.g., every packet is one hundred percent, every fifth packet is twenty five percent, etc.).

The sampling rate 143 can be adjusted in response to the congestion indicators 141 as described below. For example, every node processing an INT instruction header can be configured to employ a higher priority for forwarding user packets 121 and employ a lower priority for exporting the INT data via postcards 123 and/or passports 124. When the communications network 110 becomes congested, INT data may become lost prior to impacting the user packets 121 due to the priority settings. Such INT data may be lost because the postcards 123 and/or passports 124 are dropped. In case of significant congestion, some of the user packets 121 may also be dropped. Either case indicates a corresponding node is currently too busy to handle the INT processing. The loss of the INT data and/or indications of dropped packets may act as congestion indicators 141 to reduce the INT sampling rate 143. Hence, the collector 131 informs the controller 133 of any congestion indicator 141 (e.g., a detection of an actual or predicted data loss). The controller 133 then computes an adjusted sampling rate 143 and configures the head node(s) 111 with the adjusted sampling rate 143.

Data loss can be determined by the collector 131 in several ways. For example, in postcard based INT, the collector 131 may be aware of lost INT data when the collector 131 receives some INT data of a user packet 121 from an upstream node, but not from one or more of downstream nodes along the path. In another example, a sequence number may be added to each INT header. The collector 131 may determine a user packet 121 was dropped and some INT data was also lost when a sequence number is missing from the received INT data.

Many mechanisms can also be used to adjust the sampling rate 143 in response to receiving a congestion indicator 141 indicating actual data loss (e.g., dropped packet) or predicted data loss (e.g., node status indicator such as buffer occupancy is in excess of a threshold). For example, machine learning/reinforcement learning-based solutions may be employed. Another example includes the use of AIMD. In AIMD the sampling rate 143 is increased over each period by a predefined delta value and decreased by a multiplier value, such as one quarter, one half, etc., when a congestion indicator 141 is received. This approach slowly raises the sampling rate 143 when no congestion is present and quickly lowers the sampling rate 143 when congestion is detected in order to minimize the instances when INT has a measureable impact on the forwarding plane of the communication network 110. When using AIMD, the sampling rate 143 is generated/adjusted and transmitted periodically. For example, a period for generating/adjusting and transmitting the sampling rate 143 can be set as a round trip time (RTT) of a user packet 121 between the head node 111 and an end node 115. In this case, the sampling rate 143 is increased for every RTT of the user packets 121 that occurs with no congestion indicators 141 and decreased in each period (or immediately) when a congestion indicator 141 is received.

Figure 2:
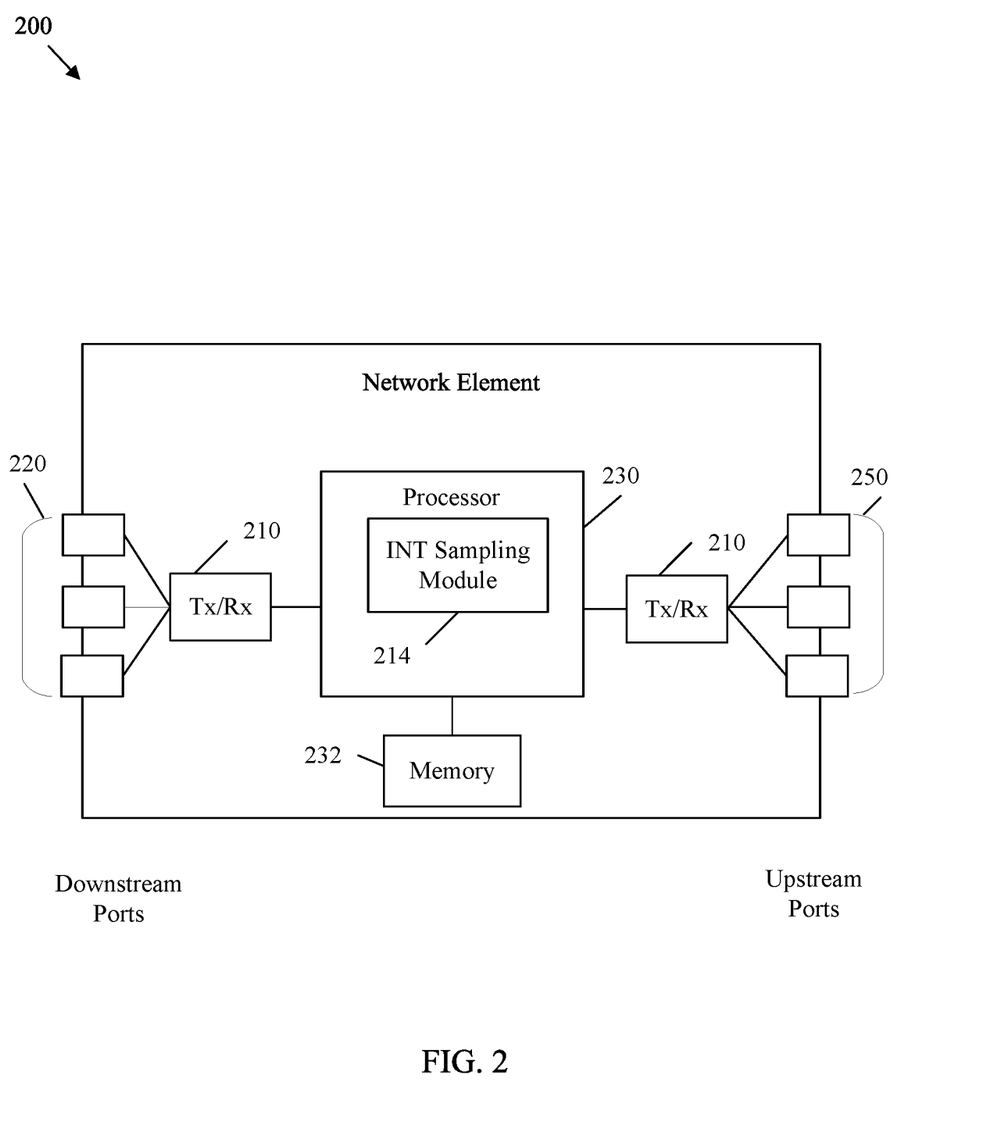
FIG. 2 is a schematic diagram of an example network element in an INT system.

FIG. 2 is a schematic diagram of an example network element 200 in an INT system. The network element 200 is suitable for implementing the disclosed examples/embodiments as described herein. The network element 200 comprises downstream ports 220, upstream ports 250, and/or transceiver units (Tx/Rx) 210, including transmitters and/or receivers for communicating data upstream and/or downstream over a network. The network element 200 also includes a processor 230 including a logic unit and/or central processing unit (CPU) to process the data and a memory 232 for storing the data. The network element 200 may also comprise electrical, optical-to-electrical (OE) components, electrical-to-optical (EO) components, and/or wireless communication components coupled to the upstream ports 250 and/or downstream ports 220 for communication of data via electrical, optical, or wireless communication networks.

The processor 230 is implemented by hardware and software. The processor 230 may be implemented as one or more CPU chips, cores (e.g., as a multi-core processor), field-programmable gate arrays (FPGAs), application specific integrated circuits (ASICs), and digital signal processors (DSPs). The processor 230 is in communication with the downstream ports 220, Tx/Rx 210, upstream ports 250, and memory 232. The processor 230 comprises an INT sampling module 214. The INT sampling module 214 implements the disclosed embodiments described above, such as method 300 as described below. The INT sampling module 214 may also implement INT sampling related mechanisms in a controller 133, collector 131, head node 111, path node 113, end node 115, and/or controller 400. For example, the INT sampling module 214 may receive congestion indicators from a collector, generate an adjusted sampling rate based on the congestion indicators, and transmit the adjusted sampling rate to a head node in order to adaptively control the rate of application of INT mechanisms employed in a communications network. The INT sampling module 214 may also implement any other method/mechanism described herein. Hence, INT sampling module 214 causes the network element 200 to provide additional functionality and/or flexibility when managing a communications network. As such, the INT sampling module 214 improves the functionality of the network element 200 as well as addresses problems that are specific to the telecommunication arts. Further, the INT sampling module 214 effects a transformation of the network element 200 to a different state. Alternatively, the INT sampling module 214 can be implemented as instructions stored in the memory 232 and executed by the processor 230 (e.g., as a computer program product including computer instructions stored on a non-transitory medium which, when executed, prompt a device to perform steps of a corresponding method).

The memory 232 comprises one or more memory types such as disks, tape drives, solid-state drives, read only memory (ROM), random access memory (RAM), flash memory, ternary content-addressable memory (TCAM), static random-access memory (SRAM), etc. The memory 232 may be used as an over-flow data storage device, to store programs when such programs are selected for execution, and to store instructions and data that are read during program execution.

Figure 3:
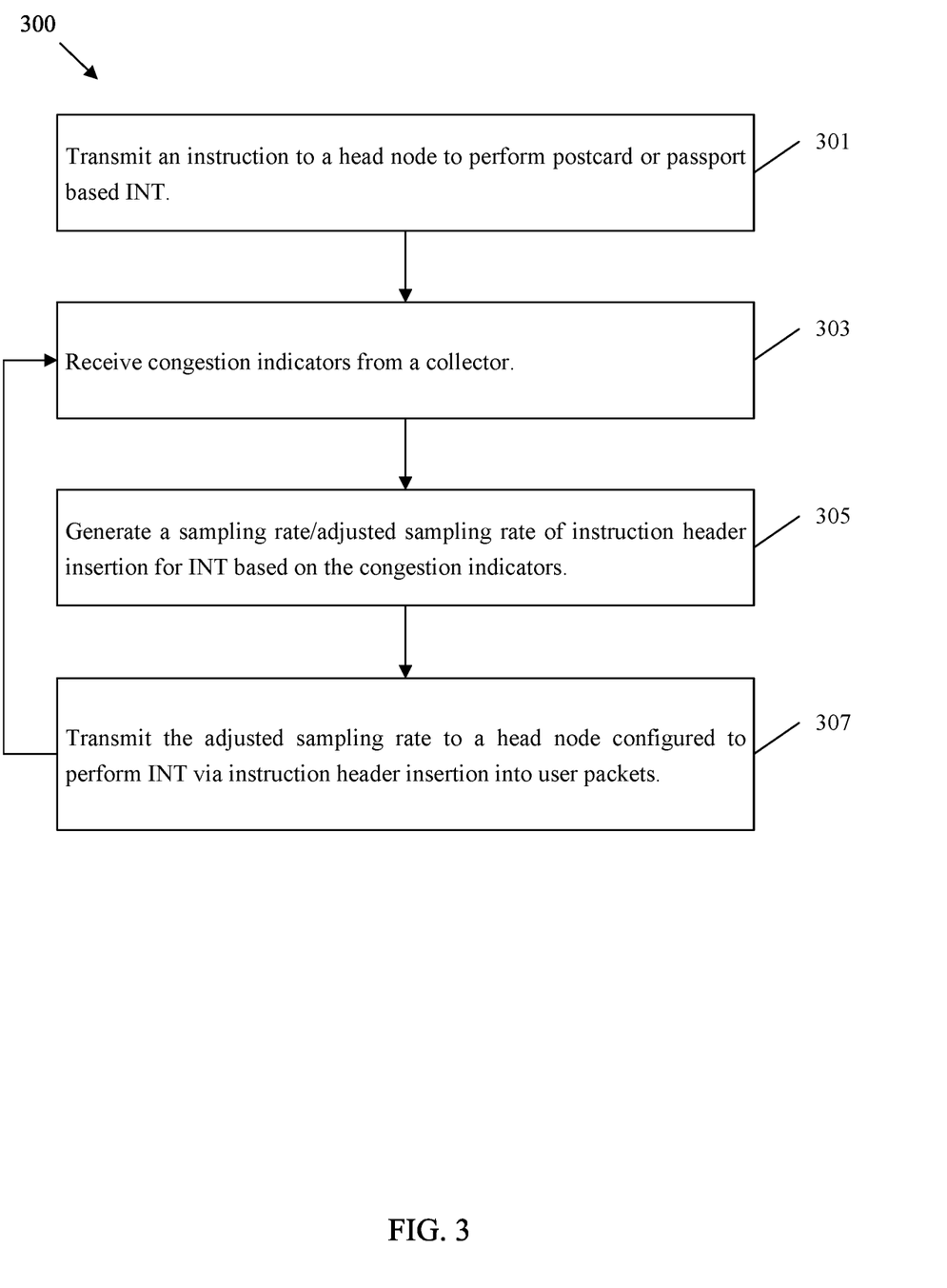
FIG. 3 is a flowchart of an example method of adaptively adjusting a sampling rate of an INT system based on network congestion.

FIG. 3 is a flowchart of an example method 300 of adaptively adjusting a sampling rate of an INT system based on network congestion. For example, method 300 may be implemented on a controller 133 and/or a network element 200 configured to manage INT mechanisms in a communications network 110.

Method 300 begins when a controller determines to implement INT for a flow. For example, this may occur when a new flow of user packets is setup. As another example, this may occur in response to an administrator request, for example to determine the source of an error in the network. At step 301, the controller transmits an instruction to a head node for a flow to perform postcard based INT and/or passport based INT, depending on the example. The instruction to perform INT may include an initial sampling rate (also referred to as the previous sampling rate in some cases). For example, the initial sampling rate may be set at one hundred percent, which indicates that INT instruction headers should be included in all user packets associated with the flow. The method 300 may then repeatedly and/or periodically complete steps 303, 305, and 307 to adaptively alter the sampling rate of the INT process based on changes in network congestion.

At step 303, the controller may receive one or more congestion indicators from a collector. The congestion indicators may include latency, packet loss, buffer size, explicit congestion notification, or combinations thereof. The congestion indicators indicate actual or predicted loss of data, and hence indicate that network resources should be allocated away from INT related tasks to mitigate the impact of INT on the network performance of data plane functions (e.g., reduce or eliminate an observer effect associated with INT).

At step 305, the controller generates an adjusted sampling rate of instruction header insertion for INT based on the congestion indicators received at step 303 and/or based on a previous sampling rate, such as the initial sampling rate used at step 301 and/or other previous sampling rate used in a previous iteration/period of the method 300. As a specific example, the controller may generate the adjusted sampling rate based on the congestion indicators according to additive increase and multiplicative decrease, which may involve additively increasing the previous sampling rate and multiplicatively decreasing the previous sampling rate depending on the presence or absence of congestion indicators over a period of time, cycles, communications, etc. Other mechanisms for adjusting the sampling rate may also be used as discussed herein.

At step 307, the controller transmits the adjusted sampling rate generated at step 305 to the head node, which is configured to perform INT via instruction header insertion into user packets. The method 300 may then return to step 303. In some examples, the adjusted sampling rate may indicate a probability of instruction header insertion for each user packet. In some examples, the adjusted sampling rate may indicate a frequency of instruction header insertion per group of user packets. As noted above, the adjusted sampling rate is generated and transmitted periodically by repeatedly performing steps 303, 305, and 307. Each iteration of steps 303, 305, and 307 may be considered a period. For example, the period for generating and transmitting the adjusted sampling rate by performing steps 303, 305, and 307 may be set as a round trip time of a user packet between the head node and an end node. Delays may be added as desired to cause the method 300 to conform to a specified period. Other periods may also be used, depending on the example.

Figure 4:
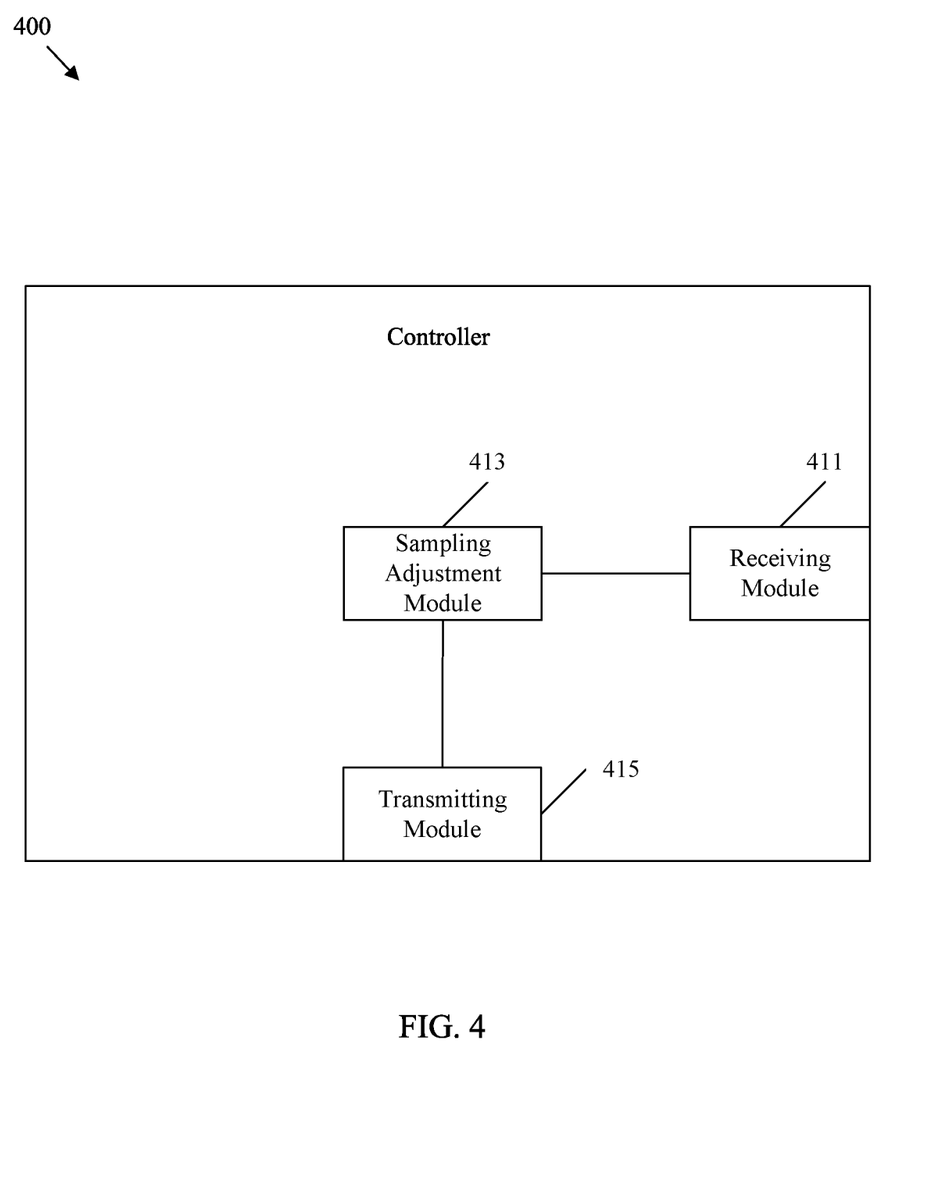
FIG. 4 is a schematic diagram of an example controller for adaptively adjusting a sampling rate of an INT system based on network congestion.

FIG. 4 is a schematic diagram of an example controller 400 for adaptively adjusting a sampling rate of an INT system based on network congestion. For example, the controller 400 may be implemented by a controller 133 and/or a network element 200 to perform method 300. The controller 400 comprises a receiving module 411 for receiving one or more congestion indicators from a collector. The controller 400 further comprises a sampling adjustment module 413 for generating an adjusted sampling rate of instruction header insertion for INT based on the congestion indicators. The controller 400 further comprises a transmitting module 415 for transmitting the adjusted sampling rate to a head node configured to perform INT via instruction header insertion into user packets. The modules of the controller 400 can also be employed to perform any of the steps/items described above with respect to method 300.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method by a controller having a processor, a receiver and a transmitter, comprising:
   receiving, by the receiver, one or more congestion indicators from a collector;
   selecting, by the processor, an adjusted sampling rate of instruction header insertions for in-band network telemetry (INT) based on the one or more congestion indicators; and
   transmitting, by the transmitter, the adjusted sampling rate to a head node configured to insert INT instruction headers into user packets at the adjusted sampling rate.

2. The method of claim 1, wherein the one or more congestion indicators include latency, packet loss, buffer size, explicit congestion notification, or combinations thereof.

3. The method of claim 1, wherein the adjusted sampling rate indicates a probability of an insertion of an instruction header for each user packet.

4. The method of claim 1, wherein the adjusted sampling rate indicates a frequency of instruction header insertions per group of user packets.

5. The method of claim 1, wherein the adjusted sampling rate is selected and transmitted periodically.

6. The method of claim 1, wherein a period for selecting and transmitting the adjusted sampling rate is set as a round trip time of a user packet between the head node and an end node.

7. The method of claim 1, wherein the adjusted sampling rate is selected based on a previous sampling rate and the one or more congestion indicators according to additive increase and multiplicative decrease.

8. The method of claim 1, further comprising transmitting, by the transmitter, an instruction to the head node to forward telemetry measurements as postcards from path nodes according to postcard based INT.

9. The method of claim 1, further comprising transmitting, by the transmitter, an instruction to the head node to forward telemetry measurements as passports from an end node according to passport based INT.

10. A controller, comprising:
- a receiver configured to receive one or more congestion indicators from a collector;
- a processor configured to receive the one or more congestion indicators from the receiver and to receive computer instructions which, when executed, prompt the controller to select an adjusted sampling rate of instruction header insertions for in-band network telemetry (INT) based on the one or more congestion indicators; and
- a transmitter configured to receive the adjusted sampling rate from the processor and to transmit the adjusted sampling rate to a head node configured to insert INT instruction headers into user packets at the adjusted sampling rate.

11. The controller of claim 10, wherein the one or more congestion indicators include latency, packet loss, buffer size, explicit congestion notification, or combinations thereof.

12. The controller of claim 10, wherein the adjusted sampling rate indicates a probability of an insertion of an instruction header for each user packet.

13. The controller of claim 10, wherein the adjusted sampling rate indicates a frequency of instruction header insertions per group of user packets.

14. The controller of claim 10, wherein the adjusted sampling rate is selected and transmitted periodically.

15. The controller of claim 10, wherein a period for selecting and transmitting the adjusted sampling rate is set as a round trip time of a user packet between the head node and an end node.

16. The controller of claim 10, wherein the adjusted sampling rate is selected based on a previous sampling rate and the one or more congestion indicators according to additive increase and multiplicative decrease.

17. The controller of claim 10, wherein the transmitter is further configured to transmit an instruction to the head node to forward telemetry measurements as postcards from path nodes according to postcard based INT.

18. The controller of claim 10, wherein the transmitter is further configured to transmit an instruction to the head node to forward telemetry measurements as passports from an end node according to passport based INT.

19. A non-transitory computer readable medium comprising a computer program product for use by a video coding device, the computer program product comprising computer executable instructions stored on the non-transitory computer readable medium such that when executed by a processor cause the video coding device to:
- receive one or more congestion indicators from a collector;
- select an adjusted sampling rate of instruction header insertions for in-band network telemetry (INT) based on the one or more congestion indicators; and
- transmit the adjusted sampling rate to a head node configured to insert INT instruction headers into user packets at the adjusted sampling rate.

20. The non-transitory computer readable medium of claim 19, wherein the computer executable instructions further cause the video coding device to transmit an instruction to the head node to forward telemetry measurements as postcards from path nodes according to postcard based INT or forward telemetry measurements as passports from an end node according to passport based INT.

* * * * *